(12) United States Patent
Iwai et al.

(10) Patent No.: US 7,890,970 B2
(45) Date of Patent: Feb. 15, 2011

(54) BRUSHLESS MOTOR, AND DISK DRIVE EQUIPPED WITH THE SAME

(75) Inventors: Yusuke Iwai, Kyoto (JP); Tomoya Uchimura, Kyoto (JP); Satoru Kuramoto, Kyoto (JP); Ken Horishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 560 days.

(21) Appl. No.: 11/866,721

(22) Filed: Oct. 3, 2007

(65) Prior Publication Data

US 2008/0079326 A1 Apr. 3, 2008

(30) Foreign Application Priority Data

Oct. 3, 2006 (JP) ............................. 2006-272128

(51) Int. Cl.
*G11B 17/028* (2006.01)

(52) U.S. Cl. ..................................... 720/707

(58) Field of Classification Search ....................... None
See application file for complete search history.

(56) References Cited

U.S. PATENT DOCUMENTS

| | | | | |
|---|---|---|---|---|
| 5,586,105 | A | * | 12/1996 | Mizuno et al. ............... 720/708 |
| 5,623,382 | A | | 4/1997 | Moritan et al. |
| 5,751,688 | A | * | 5/1998 | Mizuno et al. ............... 720/711 |
| 5,774,445 | A | | 6/1998 | Sawi et al. |
| 6,208,613 | B1 | | 3/2001 | Iizuka |
| 6,222,818 | B1 | | 4/2001 | Kobayashi et al. |
| 6,363,048 | B1 | | 3/2002 | Wu et al. |
| 6,477,133 | B1 | * | 11/2002 | Yoshimura et al. ........... 720/702 |
| 6,757,238 | B2 | * | 6/2004 | Higuchi ....................... 720/710 |
| 6,806,601 | B2 | | 10/2004 | Miyamoto |
| 6,826,771 | B1 | | 11/2004 | Wada |
| 6,832,384 | B2 | * | 12/2004 | Yamaguchi .................. 720/724 |
| 6,868,549 | B2 | | 3/2005 | Watanabe et al. |
| 7,538,459 | B2 | | 5/2009 | Ichizaki |
| 7,540,005 | B2 | | 5/2009 | Toyokawa et al. |
| 7,581,235 | B2 | | 8/2009 | Oota |
| 2004/0256926 | A1 | | 12/2004 | Miyamoto |
| 2005/0006965 | A1 | * | 1/2005 | Sato et al. .................. 310/67 R |

(Continued)

FOREIGN PATENT DOCUMENTS

JP 64-17277 A 1/1989

(Continued)

*Primary Examiner*—Mark Blouin
(74) *Attorney, Agent, or Firm*—Westerman, Hattori, Daniels & Adrian, LLP (57) ABSTRACT

In a brushless motor for use in a disk drive, a rotor is mounted onto a tube portion of a housing. A retaining claw is formed at an upper end of the tube portion. A turntable has a central concave portion which accommodates an upper portion of the tube portion of the housing. A retaining member is provided radially outside the central concave portion, and includes a plurality of retaining pieces extending to the inside of the central concave portion. When the rotor is mounted onto the housing, the retaining pieces come into contact with the retaining claw and then move upward. When the rotor moves upward relative to the housing, the retaining pieces come into contact with the retaining claw, thereby restricting upward movement of the rotor. Upward movement of the retaining pieces is restricted by contact between the retaining member and the turntable.

18 Claims, 10 Drawing Sheets

U.S. PATENT DOCUMENTS

| | | | |
|---|---|---|---|
| 2005/0223400 A1 * | 10/2005 | Matsushita et al. | 720/702 |
| 2006/0048176 A1 | 3/2006 | Choi et al. | |
| 2007/0278880 A1 | 12/2007 | Wada et al. | |
| 2007/0300247 A1 | 12/2007 | Kim et al. | |
| 2008/0002288 A1 | 1/2008 | Takaki et al. | |
| 2008/0179978 A1 | 7/2008 | Ichizaki | |

FOREIGN PATENT DOCUMENTS

| | | | |
|---|---|---|---|
| JP | 05-242649 A | 9/1993 | |
| JP | 10-080119 A | 3/1998 | |
| JP | 11-055900 A | 2/1999 | |
| JP | 11-073722 A | 3/1999 | |
| JP | 11-262214 A | 9/1999 | |
| JP | 2000-123466 A | 4/2000 | |
| JP | 2000-166170 A | 6/2000 | |
| JP | 2000-251361 A | 9/2000 | |
| JP | 2001-286113 A | 10/2001 | |
| JP | 2001-339896 A | 12/2001 | |
| JP | 2002-051495 A | 2/2002 | |
| JP | 2002-176742 A | 6/2002 | |
| JP | 2002-190149 A | 7/2002 | |
| JP | 2002-325390 A | 11/2002 | |
| JP | 2003-32932 A | 1/2003 | |
| JP | 2003-045105 A | 2/2003 | |
| JP | 2003-213812 A | 7/2003 | |
| JP | 2004-213812 A | 7/2004 | |
| JP | 2004-354757 A | 12/2004 | |
| JP | 2005-253239 A | 9/2005 | |
| JP | 2005-304284 A | 10/2005 | |
| JP | 2005-354757 A | 12/2005 | |
| JP | 2006-048821 A | 2/2006 | |
| JP | 2006-196139 A | 7/2006 | |
| KR | 1020050095085 A | 9/2005 | |

* cited by examiner

SECTION B-B

BRUSHLESS MOTOR, AND DISK DRIVE EQUIPPED WITH THE SAME

BACKGROUND OF THE INVENTION

1. Field of the Invention

The present invention relates to a brushless motor to be equipped in a disk drive for recording and reproducing or for simply reproducing information stored on an optical disk. In particular, the present invention relates to improvement in a rotor retaining mechanism in accordance with a thinned brushless motor.

2. Description of the Related Art

A personal computer mainly used as a portable device has been developed to become lighter and thinner for better portability. Accordingly, it is required to thin a disk drive to be equipped in the personal computer. Reduction in thickness can be achieved by adopting a slot-in disk drive for directly dragging a plate-shaped disk thereinto since this type of disk drive requires no tray for mounting a disk. Such improvement is not sufficient and there is still a demand for a further thinned personal computer. In order to fulfill such a demand, it is required to further thin a spindle motor (brushless motor) to be equipped in a disk drive, as well as to thin the disk drive itself to be equipped in the personal computer.

Improvement in a rotor retaining mechanism is one of objects to be achieved for obtaining a thinner brushless motor. There are, for example, two types of rotor retaining mechanisms such as a shaft retaining type and a hock-shaped type.

Figure 7:
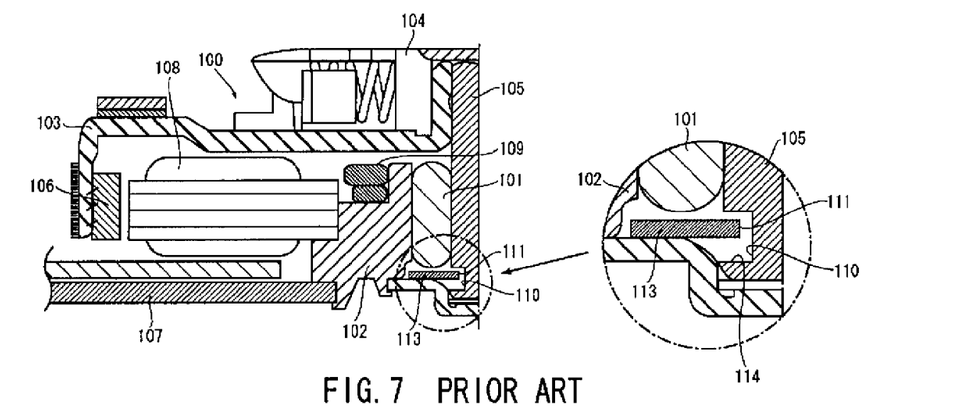
FIG. 7 is a cross-sectional view of an exemplary conventional retaining mechanism for the brushless motor.
Figure 8:
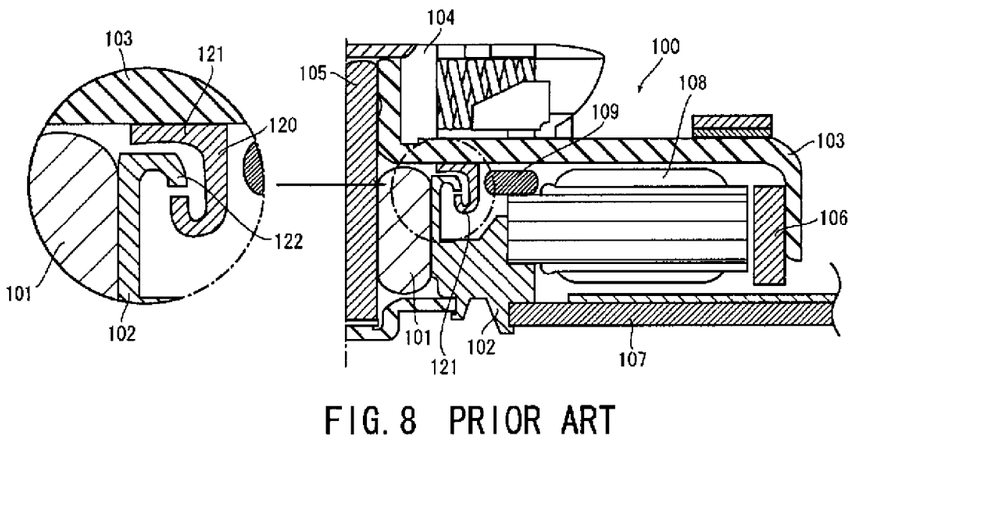
FIG. 8 is a cross-sectional view of another exemplary conventional retaining mechanism for the brushless motor.

An entire structure of the brushless motor is described with reference to FIGS. 7 and 8. FIGS. 7 and 8 are schematic views respectively showing these two types of retaining mechanisms. Each of FIGS. 7 and 8 is a partial cross-sectional view of the brushless motor to be equipped in a disk drive. In these drawings, like parts are given like reference numerals.

The brushless motor includes a rotor 100 for allowing a disk-shaped storage medium (hereinafter, simply referred to as a storage disk) such as a CD (compact disc) to be removably mounted thereon, a bearing 101 for supporting the rotor 100 in a rotatable manner, a housing 102, and the like. The rotor 100 has a turntable 103 in a substantially disk shape for allowing a storage disk to be mounted on an upper surface thereof, a chucking device 104 incorporated in the upper surface of the turntable 103 and allowing the storage disk to be removable, a shaft 105 and a rotor magnet 106 respectively attached integrally to the turntable 103. The bearing 101 for supporting the shaft 105 in a rotatable manner is fixed in the housing 102 to be mounted to a mounting plate 107. On an opposite side of the housing 102 to the shaft 105, there is fixed a stator 108 facing the rotor magnet 106 with a space therebetween and generating a rotational magnetic field to rotary drive the rotor 100. A pressurizing magnet 109 is arranged between the turntable 103 and the housing 102. The turntable 103 can be stably rotated since the turntable 103 is attracted toward the housing 102 by magnetic force.

The rotor 100 is mounted onto the housing 102 and the like by, for example, inserting the shaft 105 into the bearing 101. The rotor retaining mechanism is provided for preventing the mounted rotor 100 from dropping off the bearing 101.

As shown in FIG. 7, an example of the rotor retaining mechanism of the shaft retaining type includes a groove 110 formed near a lower end of the shaft 105 of the rotor 100 over the entire circumferential length of the shaft 105, and a retaining member 113 fixed to the housing 102 with one end 111 thereof placed inside the groove 110. According to such a configuration, the end 111 of the retaining member 113 butts an inner bottom surface 114 of the groove 110 before the rotor 100 completely drops off due to upward movement of the shaft 105, thereby preventing the rotor 100 from dropping off.

FIG. 8 shows an example of the rotor retaining mechanism of the hook-shaped type. This rotor retaining mechanism includes a retaining member 121 attached onto a bottom surface of the turntable 103 of the rotor 100 with an elastic spring arm 120 having an end in a hook shape in cross section and projecting toward the housing 102, and an engaging portion 122 provided at one end of a tube portion of the housing 102 and engaged with the hook-shaped end of the retaining member 121. According to such a configuration, the spring arm 120 is elastically deformed if the hock-shaped end of the retaining member 121 and the engaging portion 122 come into contact with each other while the rotor 100 is mounted onto the housing 102 and the like. Moreover, if force which forces the rotor 100 to drop off is applied to the rotor 100 after the rotor 100 has been mounted onto the housing 102 and the like, the rotor 100 is prevented from dropping off since the hook-shaped end of the retaining member 121 and the engaging portion 122 butt with each other.

SUMMARY OF THE INVENTION

A brushless motor according to the present invention includes a rotor and a housing. The rotor has a turntable for allowing a disk with a mounting hole formed at a center thereof to be mounted thereonto, and a shaft mounted directly or indirectly to the turntable to serve as a rotational axis. The housing has a bearing for rotatably supporting the shaft, and a tube portion with an inner peripheral surface for fixing the bearing.

The turntable has a central concave portion in a concave shape opened downwards in an axial direction. The central concave portion partially houses the tube portion of the housing. On an upper and outer surface of the tube portion of the housing, there is formed a retaining claw projecting radially outwards.

A retaining member is attached onto a bottom surface of the turntable. The retaining member includes a mounting base and a plurality of retaining pieces. In a state where the rotor is mounted onto the housing, the retaining member is arranged axially below the retaining claw.

When mounting the rotor onto the housing, due to contact between the plurality of retaining pieces and the retaining claw, outer peripheral portions of the retaining pieces are inclined axially downwards and inner peripheral portions of the retaining pieces in contact with the retaining claw are inclined axially upwards.

When the rotor moves axially upwards with respect to the housing after the rotor has been mounted onto the housing, the inner peripheral portions contact the retaining claw and the outer peripheral portions contact the bottom surface of the turntable.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Referring to FIGS. 1 through 6, 9 and 10, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

Figure 1:
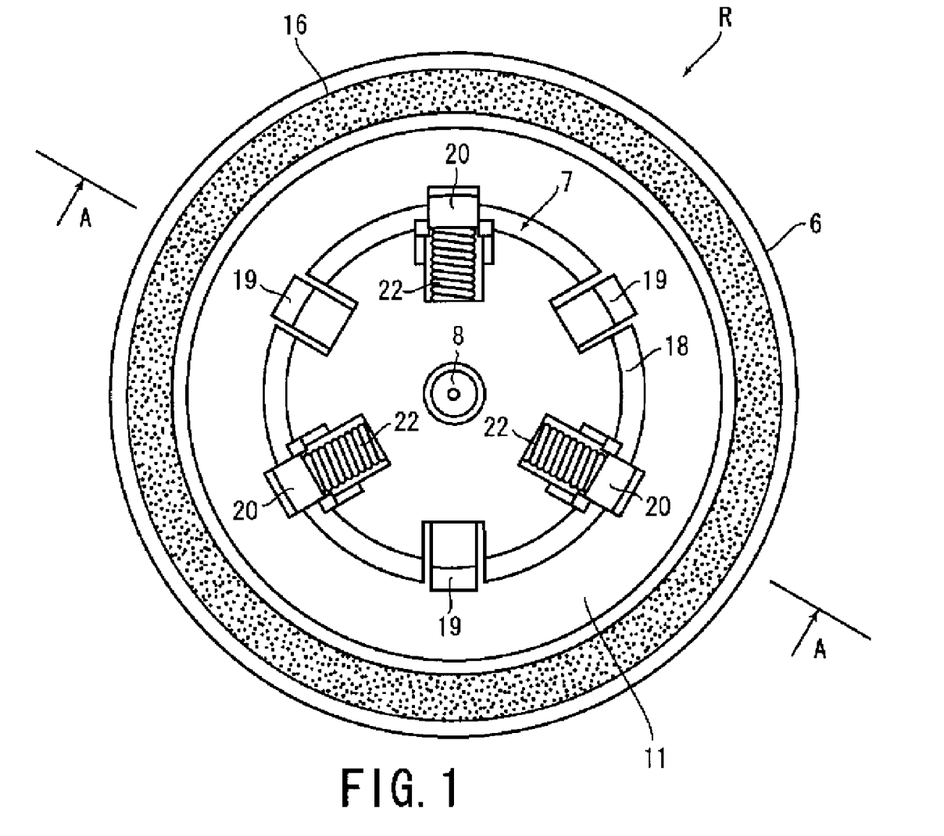
FIG. 1 is a plan view of a brushless motor according to a preferred embodiment of the present invention seen from above.
Figure 2:
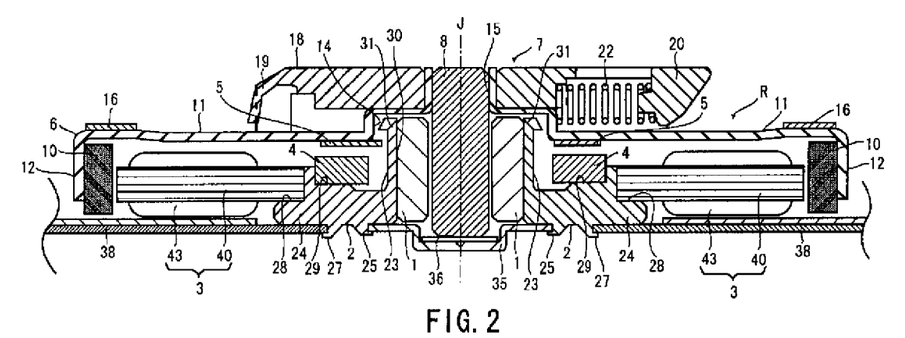
FIG. 2 is a cross-sectional view of the brushless motor of FIG. 1, cut along line A-A in FIG. 1.

FIG. 1 is a plan view of a brushless motor according to a preferred embodiment of the present invention, seen from above. FIG. 2 is a cross-sectional view of the brushless motor of FIG. 1, cut along line A-A in FIG. 1. The brushless motor has such a dimension that a turntable 6 shown in FIG. 1 has a diameter of approximately 3 cm.

The brushless motor includes a rotor R for rotating an optical storage medium disk in the form of a disk mounted thereonto about a rotational axis, a bearing 1 for supporting the rotor R in a rotatable manner, a housing 2, a stator 3, a pressurizing magnet 4, a retaining member 5, and the like. Examples of the optical storage medium are CD and DVD.

The rotor R includes the turntable 6 in a substantially disk shape, a chucking device 7 attached on a central portion of the turntable 6, a shaft 8 attached at a center of the turntable 6 along an axial direction substantially parallel to the rotational axis, and a rotor magnet 10 attached at an outer peripheral portion of the turntable 6.

The turntable 6 is formed by pressing a thin magnetic steel plate made of stainless steel, for example. Referring to FIG. 2, the turntable 6 includes a lid portion 11 and a cylindrical portion 12. The lid portion 11 has a substantially circular disk shape. An outer peripheral portion of the lid portion 11 is slightly raised. The turntable 6 also includes a cylindrical portion 12 extending downwards from an outer peripheral edge of the lid portion 11. At a center of the lid portion 11, a central concave portion 14 and a shaft fixing portion 15 are formed. The central concave portion 14 is hollow and cylindrical about the rotation axis J and extends upward from the lid portion 11. The shaft fixing portion 15 extends axially upward from the central concave portion 14 and is hollow and cylindrical about the rotation axis J. A diameter of the shaft fixing portion 15 is smaller than that of the central concave portion 14. There is formed an opening penetrating from an upper surface to a lower surface of the turntable 6 at an upper end of the shaft fixing portion 15. Axial centers of the turntable 6, the central concave portion 14, and the shaft fixing portion 15 are identical to an axial center J serving as the rotational axis.

Attached to an outer peripheral edge of the upper surface of the turntable 6 is a disk supporting member 16 made of rubber or the like, for receiving and supporting an optical disk. The rotor magnet 10 made of a permanent magnet is fixed onto an inner peripheral surface of the cylindrical portion 12 of the turntable 6. Structural strength of the turntable 6 is increased by provision of a plurality of bent portions such as the central concave portion 14 and the shaft fixing portion 15 at the center of the lid portion 11 by press work. Thus, the turntable 6 may be made of an ultrathin steel plate (having a thickness of approximately 0.3 mm in the present embodiment). Radially outside the central concave portion 14, there is formed a flat surface portion extending radially outwards. An inner peripheral surface of the central concave portion 14 and a lower surface of the flat surface portion are connected to each other with a curved surface.

With reference to FIG. 1, the chucking device 7 includes a centering case 18 in a generally cylindrical shape, center adjusting claws 19 formed integrally with the centering case 18, dog members 20 for holding an optical disk, and the like. In the present preferred embodiment, three center adjusting claws 19 and three dog members 20 are equiangularly arranged along an outer periphery of the centering case 18. The dog members 20 are constantly biased radially outwards by coil springs 22 provided in the centering case 18. An optical disk with a mounting hole formed at a center thereof is removably mounted onto the turntable 6 by fitting the mounting hole to the centering case 18 from upwards.

The shaft 8 is made of material which is excellent in abrasion resistance, e.g., stainless steel. The shaft 8 is inserted into the shaft fixing portion 15 of the turntable 6 and is fixed integrally therewith such that a lower end of the shaft 8 projects downwards. The shaft 8 is fixed coaxially with the axial center J of the turntable 6 and the chucking device 7. While the turntable 6 and the shaft 8 are separately formed from each other in the present preferred embodiment, the turntable 6 and the shaft 8 may be integrally formed. Moreover, the shaft 8 may be fixed indirectly to the turntable 6 with another member interposed therebetween, instead of being fixed directly to the turntable 6.

The bearing 1, the housing 2, the stator 3, the pressurizing magnet 4, the retaining member 5, and the like are respectively arranged under the lid portion 11 of the turntable 6 of the rotor R.

The housing 2 has a tube portion 23 in a generally cylindrical shape, and a fixing base portion 24 extending radially outwards from an axially lower portion of the tube portion 23. An inward projection 25 and an outward projection 27 are provided on a bottom surface of the fixing base portion 24. The inward projection 25 is provided radially inside the outward projection 27. Formed at an outer periphery of an upper surface of the fixing base portion 24 is an outward step 28 having a peripheral surface along the axial direction and a flat surface extending radially outwards from a lower end of the peripheral surface. The stator 3 is fixed onto the outward step 28. On the other hand, an inward step 29 is formed radially inside the outward step 28, the inward step 29 having a peripheral surface along the axial direction and a flat surface extending radially inwards from a lower end of the peripheral surface. The pressurizing magnet 4 is fixed onto the inward step 29.

The tube portion 23 has an inner surface defining a through hole 30 penetrating through the housing 2 in the axial direction. The bearing 1 is fixed onto the inner peripheral surface of the tube portion 23. A retaining claw 31 projecting radially outwards is formed on an upper and outer peripheral surface of the tube portion 23. The retaining claw 31 is formed integrally with the tube portion 23. The retaining claw 31 has an inclined surface 33 inclined with respect to the axial direction such that it moves away from the axis J as it moves downwards. The retaining claw 31 further includes a flat surface 34 which is substantially perpendicular to the axial direction and extends from a lower end of the inclined surface 33 radially inwards (refer to FIGS. 4 and 5). At least the upper end of the tube portion 23 formed with the retaining claw 31 is housed within the central concave portion 14 of the turntable 6.

A lower side of the opening in the tube portion 23 of the housing 2 is covered with a bottom lid 35. The bottom lid 35 is fixed by being sandwiched between the bottom surface of the fixing base portion 24 and the inward projection 25 of the housing 2. In other words, the bottom lid 35 is fixed to the housing 2 by crimping. On an upper surface of the bottom lid 35, there is arranged a thrust plate 36 having a generally disk shape and receiving the lower end surface of the shaft 8. A mounting plate 38 is fixed to an outer periphery of the bottom surface of the fixing base portion 24. The mounting plate 38 is fixed by being sandwiched between the bottom surface of the fixing base portion 24 and the outward projection 27. In other words, the mounting plate 38 is fixed to the housing 2 by crimping. The mounting plate 38 covers a lower side of the turntable 6.

The stator 3 includes a stator core 40 having a core back portion in a generally annular shape and a plurality of teeth respectively extending radially outwards from the core back portion and circumferentially spaced apart from one another, and coils 43 formed by winding conductive wires around each of the teeth of the stator core 40. The stator 3 radially faces the rotor magnet 10 attached to the turntable 6 with a space therebetween. The rotor magnet 10 is rotated integrally with the turntable 6 and the shaft 8 due to a rotational magnetic field generated by the stator 3.

The pressurizing magnet 4 is made of a permanent magnet in an annular shape. The pressurizing magnet 4 magnetically attracts the turntable 6 toward the housing 2, and stabilizes rotation of the rotor R. The pressurizing magnet 4 is arranged so as to axially face the lid portion 11 of the turntable 6. The pressurizing magnet 4 is arranged substantially coaxially with the axial center J of the rotor R, and is fixed onto the inward step 29 of the fixing base portion 24. Further, the pressurizing magnet 4 is arranged such that an inner peripheral surface thereof is radially spaced apart from the outer peripheral surface of the tube portion 23. In such a configuration, an adequate space in the axial direction can be provided under the turntable 6. Therefore, the brushless motor can be thinned even when a pressurizing magnet 4 having a large volume is used.

Figure 3A:
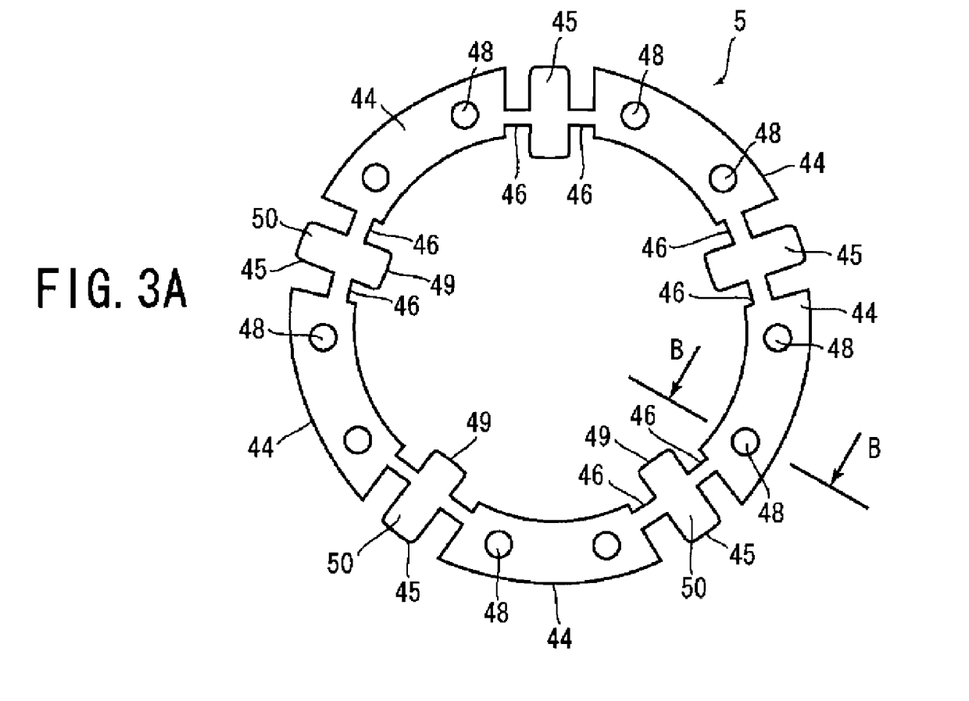
FIG. 3A is a plan view of a retaining member of the brushless motor of FIG. 1 seen from above.
Figure 3B:
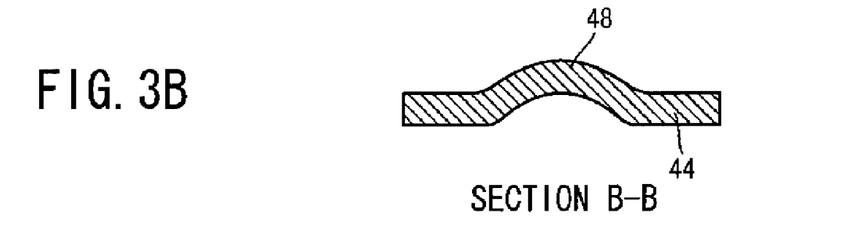
FIG. 3B is a cross-sectional view of the retaining member of FIG. 3A cut along line B-B in FIG. 3A.

The retaining member 5 is obtained by pressing a thin metal plate. A specific structure of the retaining member 5 is shown in FIGS. 3A and 3B. FIG. 3A is a plan view of the retaining member 5. FIG. 3B is a cross-sectional view of the retaining member 5 of FIG. 3A, cut along line B-B and seen in a direction of an arrow in FIG. 3A. As shown in FIG. 3A, the retaining member 5 is formed into a generally annular shape. The retaining member 5 includes a plurality of mounting bases 44 (five in the present embodiment) arranged to be circumferentially spaced apart from one another, a plurality of retaining pieces 45 (five in the present embodiment) each arranged between the circumferentially adjacent mounting bases 44, and a plurality of pairs of supporting portions 46, 46 for connecting the respective mounting bases 44 and the respective retaining pieces 45. All the mounting bases 44, the retaining pieces 45, and the supporting portions 46 are integrally formed by press work.

Each of the mounting bases 44 has a generally circular arc shape. As shown in FIG. 3B, each of the mounting bases 44 is formed with a plurality of projections 48 (in the present embodiment, two for each of the mounting bases 44) along a circumferential direction, and the projections 48 are to be welded when the mounting bases 44 are fixed to the turntable 6. The plurality of projections 48 are formed by concaving the mounting bases 44.

Each of the retaining pieces 45 is formed into a generally rectangular shape radially elongated with rounded corners. Each of the retaining pieces 45 is supported with respect to the circumferentially adjacent mounting bases 44 by the pair of supporting portions 46, 46 each having a thin bar shape and circumferentially projecting from both circumferential side surfaces of each of the retaining pieces 45. Each of the retaining pieces 45 has an inner peripheral portion 49 extending radially inwards from the supporting portions 46, and an outer peripheral portion 50 (outwardly extending portion) extending radially outwards from the supporting portions 46. Each of the inner peripheral portions 49 projects radially inwards from the inner peripheral edges of the mounting bases 44.

The supporting portions 46 have a radial width smaller than that of the mounting bases 44. Each of the supporting portions 46 is formed radially inside a center of the radial width of each of the mounting bases 44. Since the radial width of the supporting portions 46 is made smaller than the radial width of the mounting bases 44, in a case where force is applied to the inner peripheral portion 49 or the outer peripheral portion 50 of each of the retaining pieces 45 and around the adjacent supporting portions, the supporting portions 46 bow and the retaining piece 45 can rotate with the adjacent supporting portions 46 serving as supporting points. Moreover, since each of the supporting portions 46 is formed radially inside the center of the radial width of the mounting bases 44, the inner peripheral portions 49 of the retaining pieces 45 are easily moved axially upwards and are not easily moved axially downwards.

As shown in FIG. 2, the retaining member 5 is attached onto the bottom surface of the turntable 6. Specifically, the retaining member 5 is fixed to the peripheral edge of the central concave portion 14 so that the mounting bases 44 are located radially outside the central concave portion 14. In a state where the retaining member 5 is fixed to the turntable 6, at least distal ends of the inner peripheral portions 49 of the retaining pieces 45 project radially inside the central concave portion 14. When the rotor R is mounted onto the housing 2, the inner peripheral portions 49 of the retaining pieces 45 come into contact with the retaining claw 31 (refer to FIGS. 4 and 5). After the rotor R has been mounted onto the housing 2, the retaining member 5 axially faces the pressurizing magnet 4 fixed onto the housing 2 with a space therebetween. Further, the supporting portions 46 are located at the same radial position as the inner peripheral edge of the flat surface portion of the turntable 6.

The retaining member 5 is preferably attached to the turntable 6 by resistance welding such as spot welding. Specifically, in a state where the distal ends of the projections 48 on the mounting bases 44 are brought into contact with the turntable 6, the contact portions are heated by flowing electricity. The projections 48 and the turntable 6 are fixed to each other by melting the contact portions therebetween and then pressurizing. By providing the projections 48 to be welded, portions to be welded can be clearly defined and areas to be welded can be decreased. Accordingly, it is possible to prevent deformation of the turntable 6 due to heat generated by welding. As a result, it is possible to provide a brushless motor allowing a disk to be accurately mounted.

Figure 4:
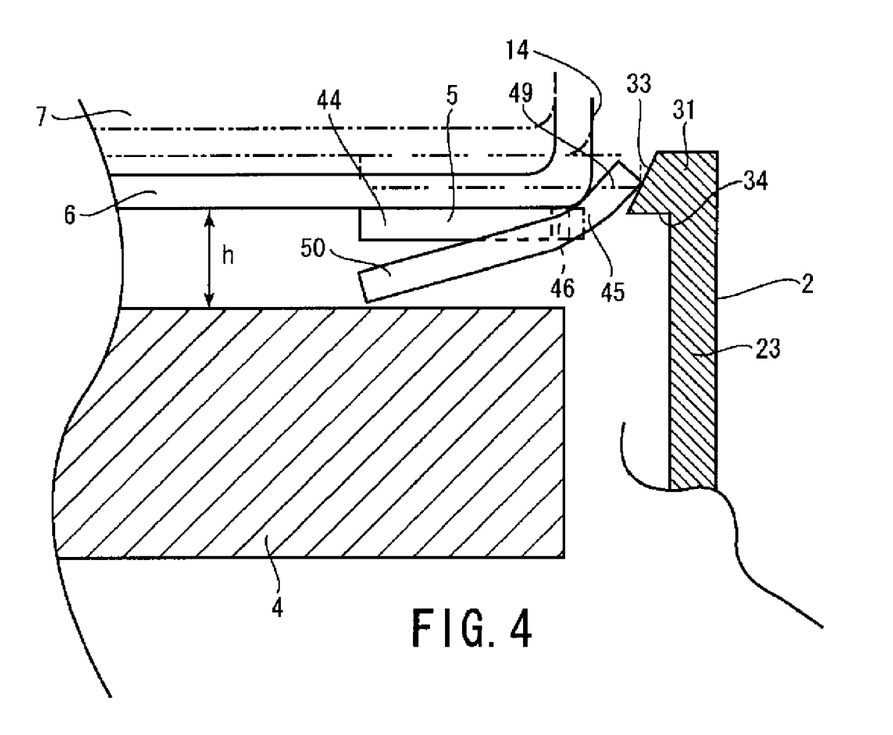
FIG. 4 illustrates a shape change of a retaining member when a rotor is mounted onto a housing in the brushless motor of FIG. 1.
Figure 5:
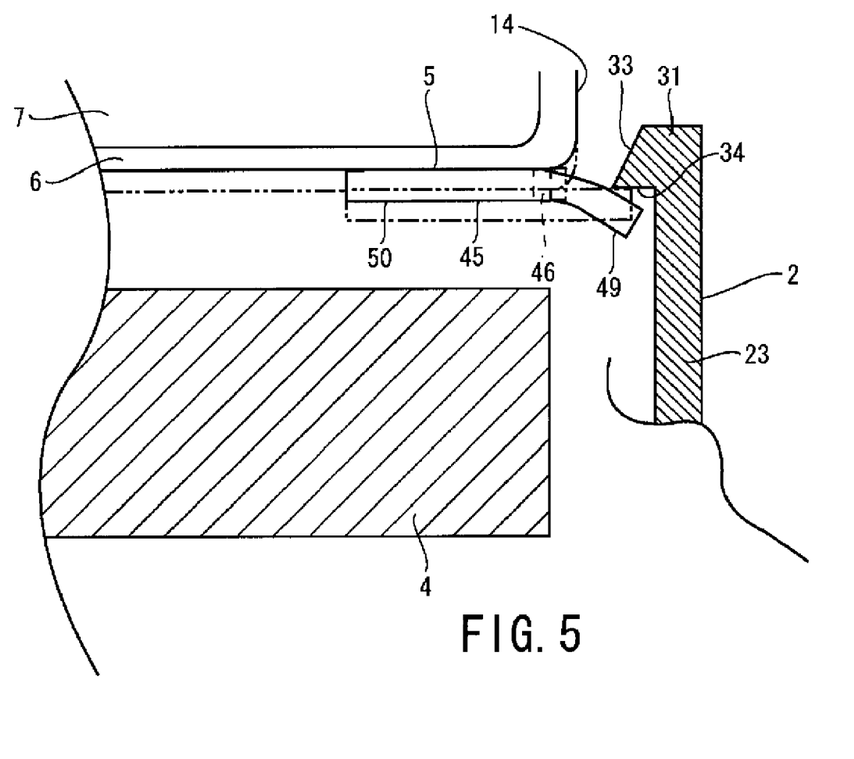
FIG. 5 illustrates a shape charge of the retaining member when force for separating the rotor from the housing is applied to the rotor.

With reference to FIGS. 4 and 5, described below is a retaining mechanism utilizing the retaining member 5 according to the present preferred embodiment of the present invention. The retaining mechanism includes the retaining member 5, and the retaining claw 31 formed on the housing 2.

The rotor R is mounted onto the housing 2 by combining the turntable 6, the chucking device 7, the rotor magnet 10, the retaining member 5, and the like, and then inserting the shaft 8 of the rotor R into the bearing 1 of the housing 2 combined with the pressurizing magnet 4, the stator 3, and the like. FIG. 4 shows a relation between the retaining member 5 and the retaining claw 31 when the rotor R is mounted onto the housing 2.

With reference to FIG. 4, when the shaft 8 is inserted into the bearing 1, the inner peripheral portions 49 of the retaining pieces 45 come into contact with the inclined surface 33 of the retaining claw 31 (as shown by dashed-two dotted line in FIG. 4). Thus, force in an axially upward direction is gradually applied to the inner peripheral portions 49 of the retaining pieces 45 due to contact with the inclined surface 33. Because of such force, the inner peripheral edges of the inner peripheral portions 49 of the retaining pieces 45 move upwards while the inner peripheral portions 49 are elastically deformed upwards with the supporting portions 46 serving as the supporting points. Further, since the supporting portions 46 themselves bow, the inner peripheral portions 49 are moved upwards and the outer peripheral portions 50 are moved downwards with the supporting portions 46 serving as the supporting points. That is, the retaining pieces 45 are inclined such that it moves downward as it moves radially outwards. It is possible to reduce force to mount the rotor R onto the housing 2 due to contact between the inclined surface 33 and the retaining pieces 45. In addition, the force to mount the rotor R onto the housing 2 can be further reduced due to elastic deformation of the inner peripheral portions 49. As a result, it is possible to prevent deformation of the turntable 6 by the force to mount the rotor R onto the housing 2, even when the turntable 6 is made thinner in accordance with the thinned brushless motor.

The supporting portions 46 in the retaining member 5 are preferably arranged at the inner peripheral edge of the flat surface portion of the turntable 6. Since the curved surface is formed to connect the inner peripheral edge of the flat surface portion and the inner peripheral surface the central concave portion 14, it is possible to reduce force applied from the turntable 6 onto the upper surfaces of the inner peripheral portions 49 when the inner peripheral portions 49 are elastically deformed. Further, since the inner peripheral portions 49 do not contact the bottom surface of the turntable 6, the retaining pieces 45 easily bow in the vicinity of the supporting portions 46. Consequently, it is possible to reduce the force to mount the rotor R onto the housing 2.

It is preferable that the inclined surface 33 be formed so as to allow the inner peripheral portions 19 to be elastically deformed and return to its original state at least reversibly when the inner peripheral portions 49 of the retaining pieces 45 move axially upwards. The supporting portions 46 are arranged at the inner peripheral edge of the flat surface portion of the turntable 6, thereby reducing a radius of axially upward movement of the inner peripheral portions 49 with the supporting portions 46 serving as the supporting points. Thus, bowing of the inner peripheral portions 49 is made smaller and the supporting portions 46 are easily made to bow. As a result, plastic deformation of the inner peripheral portions 49 can be prevented.

In order to obtain a thinner brushless motor, it is also desirable to minimize the space between the retaining member 5 and the pressurizing magnet 4 that axially face with each other. However, in the present embodiment, the distance between the retaining member and the pressurizing magnet 4 is made larger than an axial distance of axially downward movement of the outer peripheral portions 50 of the retaining pieces 45. Accordingly, it is possible to reduce the force to mount the rotor R onto the housing 2. Further, extreme plastic deformation of or damage to the supporting portions 46 may occur due to excessive movement of the retaining pieces 45 when mounting the rotor R onto the housing 2. According to the present embodiment, such excessive movement can be prevented due to contact between the outer peripheral portions 50 of the retaining pieces 45 and the upper surface of the pressurizing magnet 4.

FIG. 5 shows a relation between the retaining member 5 and the retaining claw 31 when force to drop off the rotor R with respect to the housing 2 (an axially upward direction in FIG. 5) is applied to the rotor R. As shown in FIG. 5, when the force to drop off the rotor R with respect to the housing 2 is applied to the rotor R and the rotor P moves axially upwards with respect to the housing 2, the inner peripheral portions 49 of the retaining pieces 45 are brought into contact with the vertical surface 34 of the retaining claw 31 (as shown by dashed-two dotted line in FIG. 5). Further, when the force to drop off the rotor R with respect to the housing 2 is applied to the rotor R, the inner peripheral portions 49 of the retaining pieces 45 are elastically deformed downwards. In such a state, even when the supporting portions 46 bow so that the inner peripheral portions 49 of the retaining pieces 45 are downwardly moved, such downward movement of the inner peripheral portions 49 is restricted due to contact between the outer peripheral portions 50 and the bottom surface of the turntable 6. In other words, the retaining pieces 45 themselves hardly move downwards. Accordingly, the retaining pieces 45 cannot move to an upper side of the retaining claw 31 unless the inner peripheral edges of the inner peripheral portions 49 are deformed so as to be located radially outside the cuter peripheral edge of the retaining claw 31. In particular, since the supporting portions 46 are formed at the inner peripheral edge of the flat surface portion of the turntable 6, the radial distance between the supporting portions 46 and the retaining claw 31 can be reduced, thereby making deformation of the inner peripheral portions 49 more difficult. As a result, the rotor R can be securely prevented from dropping off with respect to the housing 2.

It is desirable that the radial width of the outer peripheral portions 50 of the retaining pieces 45 be larger than the radial width of the inner peripheral portions 49. According to such a structure, even when the force to drop off the rotor R with respect to the housing 2 is applied to the rotor R, the retaining pieces 45 can be more securely supported since the areas of contact between the bottom surface of the turntable C and the outer peripheral portions 50 can be increased.

Figure 9:
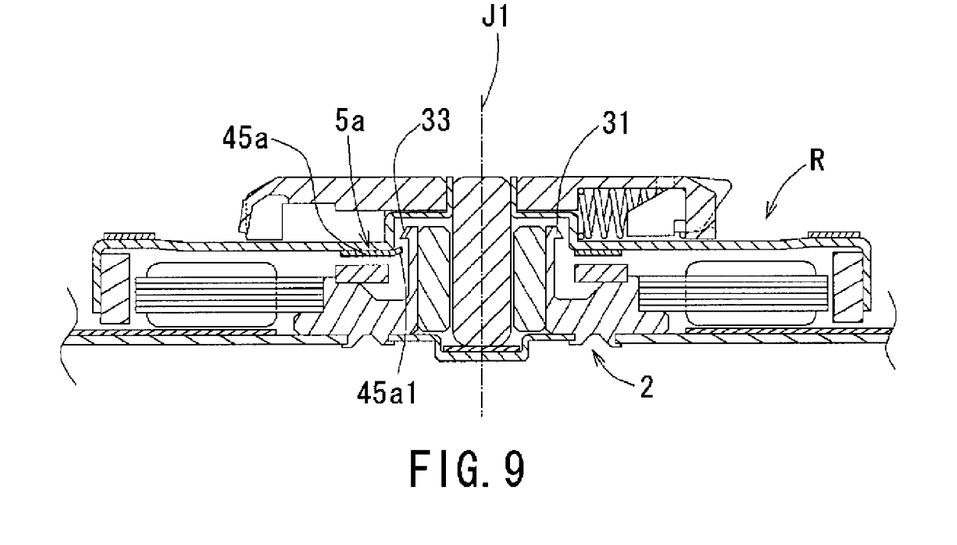
FIG. 9 shows a brushless motor according to another preferred embodiment of the present invention.
Figure 10:
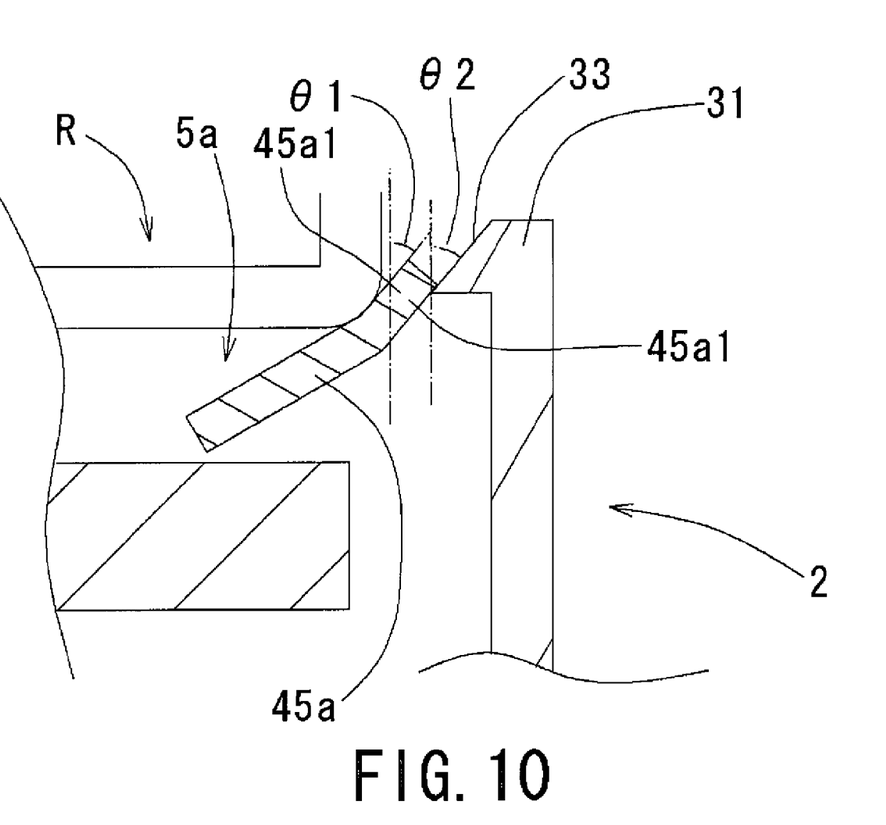
FIG. 10 shows a shape change of a retaining member of the brushless motor of FIG. 9 when a rotor is mounted onto a housing in the brushless motor.

A brushless motor according to another preferred embodiment of the present invention is now described referring to FIGS. 9 and 10. In the following description, a retaining member thereof is mainly described. FIG. 9 is a cross-sectional view of the brushless motor of this preferred embodiment of the present invention, taken along its axial direction. FIG. 10 shows the shape change of the retaining member 5*a* when the rotor R is mounted to the housing 2. The brushless motor of this preferred embodiment is similar to that of the above preferred embodiment and differences between them are mainly described in the following description. Like components are given like reference numerals and the detailed description thereof is omitted.

Referring to FIG. 9, the retaining piece 45*a* of the retaining member 5*a* is bent upward at a point below the inner circumferential surface of the central concave portion 14, so that a portion 45*a*1 of the retaining piece 45*a* located radially inside that point is at an angle to the axial and radial directions. This portion 45*a*1 is referred to an inclined portion 45*a*1. Except for the inclined portion 45*a*1, the retaining member 5*a* is the same as the retaining member of the above preferred embodiment. A radially inner end of the inclined portion 45*a*1 is located radially inside the radially outer end of the retaining claw 31 of the housing 2.

Referring to FIG. 10, the shape change of the retaining member 5*a* is now described. When the rotor R is mounted to the housing 2, a lower surface of the inclined portion 45*a*1 comes into contact with the inclined surface 33 of the retaining claw 31 and thereafter the inclined portion 45*a*1 moves axially upward. An angle θ1 formed by the lower surface of the inclined portion 45*a*1 located at the axially uppermost position and the rotation shaft J1 is equal to or smaller than an angle θ2 formed by the inclined surface 33 and the rotation shaft J1. With this configuration, it is possible to prevent the inclined portion 45*a*1 from applying large force to the inclined surface 33 when the rotor R is mounted onto the housing 2. Therefore, force required for mounting the rotor R onto the housing 2 can be reduced.

<Disk Drive>

Figure 6:
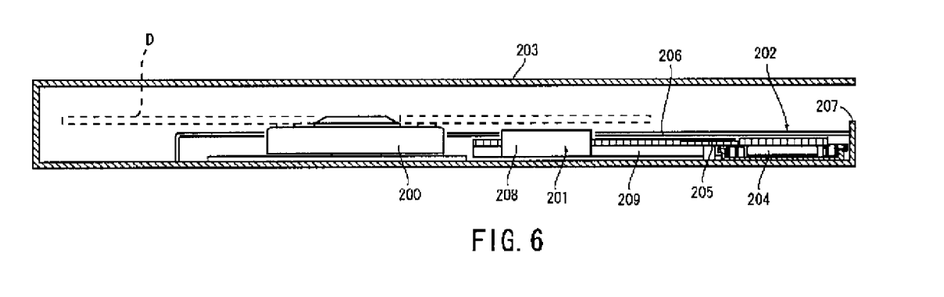
FIG. 6 is a cross-sectional view of a disk drive equipped with the brushless motor of FIG. 1 according to a preferred embodiment the present invention, cut along a rotational axis of the brushless motor.

With reference to FIG. 6, there is described a disk drive equipped with the brushless motor of the preferred embodiment of the present invention. FIG. 6 is a cross-sectional view of the disk drive.

With reference to FIG. 6, the disk drive includes a brushless motor 200 for allowing a disk D to be removable and rotating the disk D, an optical pickup 201 for radiating light onto the disk D and emitting the light reflected from the disk D, a moving mechanism 202 for reciprocating the optical pickup 201 along a radial direction of the disk D, and a housing 203 for housing the brushless motor 200, the optical pickup 201, and the moving mechanism 202.

The moving mechanism 202 includes a motor 204, and a gear 205 for receiving rotary torque transmitted from the motor 204.

In the housing 203, a partition 206 is arranged for separating the disk D from the moving mechanism 202. The housing 203 is formed with an opening 207 for allowing the disk D to be inserted and taken out therethrough.

The optical pickup 201 includes a light emitting and receiving portion 208 for emitting and receiving a laser beam, and a moving portion 209 to be engaged with the gear 205. The moving portion 209 is radially reciprocated along with the gear 205 to be rotary driven by the motor 204. The light emitting and receiving portion 208 is radially reciprocated along with reciprocation of the moving portion 209.

By mounting the brushless motor according to the above preferred embodiment of the present invention, the disk drive can be easily thinned.

While there have been described the brushless motor and the disk drive according to the above preferred embodiment of the present invention, the present invention is not limited thereto, but various modifications can be made within the scope of the appended claims.

For example, while the retaining member 5 according to the above preferred embodiment of the present invention has the annular shape, the present invention is not limited thereto, but the retaining member 5 may have a substantially circular arc shape like a partially missing circle. Further, while five retaining members 5 are formed in the above preferred embodiment, three retaining members 5 may be alternatively formed. When three or five retaining pieces 45 are formed, the retaining member 5 is well balanced and the circumferential width of the mounting bases 44 can be adequately secured. Therefore, the retaining member 5 and the turntable 6 are easily welded. As a result, it is possible to improve productivity of the brushless motor.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A brushless motor comprising:
    a rotor rotatable about a rotation axis and including a shaft centered on the rotation axis; a turntable in a generally disk shape mounted directly or indirectly to the shaft and allowing a disk with a mounting hole formed at its center to be mounted thereonto; and a rotor magnet rotating integrally with the turntable and the shaft;
    a bearing supporting the shaft in a rotatable manner;
    a housing having a tube portion with an inner peripheral surface onto which the bearing is fixed; and
    a stator facing the rotor magnet with a space therebetween and generating a rotational magnetic field, wherein
    the housing has, on an upper and outer surface of the tube portion, a retaining claw projecting radially outwards,
    the turntable has a central concave portion in a concave shape opened axially downwards, the central concave portion housing at least an upper end of the tube portion,
    the turntable is attached with a retaining member radially outside the central concave portion,
    the retaining member includes:
    a mounting base attached to the turntable; and
    a plurality of retaining pieces arranged axially below the retaining claw and projecting radially inwards from a radially outer end of the retaining claw in a state where the rotor is mounted onto the housing,
    when the rotor is mounted onto the housing, due to contact between the plurality of retaining pieces and the retaining claw, outer peripheral portions of the plurality of retaining pieces are inclined axially downwards and inner peripheral portions of the plurality of retaining pieces in contact with the retaining claw are inclined axially upwards, and
    when the rotor moves axially upwards with respect to the housing and the plurality of retaining pieces contact the retaining claw, contact between the outer peripheral portions of the plurality of retaining pieces and the turntable restricts axially downward inclination of the inner peripheral portions of the plurality of retaining pieces.

2. The brushless motor according to claim 1, wherein the retaining claw has:
- an inclined surface inclined axially downwards toward a radially outer side, the inclined surface contacting the retaining pieces when mounting the rotor onto the housing; and
- a vertical surface substantially vertical to the rotational axis, the vertical surface contacting the retaining pieces when the rotor moves axially upwards with respect to the housing.

3. The brushless motor according to claim 1, wherein
the retaining member is made of a plate member having one of a substantially circular arc shape and a substantially annular shape,
the mounting base has a circular arc shape, and a plurality of mounting bases are arranged to be circumferentially spaced apart from one another,
each of the retaining pieces is provided between the circumferentially adjacent mounting bases and projects radially inwards from inner peripheral edges of the mounting bases, and
the mounting bases and the retaining pieces are respectively connected via supporting portions having a radial width smaller than a radial width of the mounting bases.

4. The brushless motor according to claim 3, wherein
each of the supporting portions is formed radially inside a center of the radial width of the mounting bases.

5. The brushless motor according to claim 3, wherein
each of the retaining pieces has an outwardly extending portion extending radially outwards from the supporting portions.

6. The brushless motor according to claim 5, wherein
the outwardly extending portion has a radial width larger than a radial width of each of the retaining pieces between the supporting portions and a radially inner end.

7. The brushless motor according to claim 3, wherein
when mounting the rotor onto the housing, a portion of each of the retaining pieces radially inside the supporting portions moves axially upwards and a portion of each of the retaining pieces radially outside the supporting portions moves axially downwards, and
when the rotor moves axially upwards with respect to the housing and the plurality of retaining pieces contact the retaining claw, contact between the portions of the retaining pieces radially outside the supporting portions and the turntable restricts axially upward movement of the portions of the retaining pieces radially inside the supporting portions.

8. The brushless motor according to claim 7, wherein
the turntable has a flat surface portion extending radially outwards from a lower end of the central concave portion, and
the supporting portions are arranged at an inner peripheral edge of the flat surface portion.

9. The brushless motor according to claim 8, wherein
an inner peripheral surface of the central concave portion and a lower surface of the flat surface portion are connected with a curved surface.

10. The brushless motor according to claim 1, wherein
the retaining member is obtained by pressing metal, and
at least the mounting base and the retaining piece are integrally formed by punching.

11. The brushless motor according to claim 1, wherein
the mounting base is formed with a plurality of projections circumferentially spaced apart from one another, and
in a state where the plurality of projections are brought into contact with the turntable, the retaining member is fixed to the turntable by melting the plurality of projections.

12. The brushless motor according to claim 11, wherein
each of the retaining member and the turntable is made of an electrical conducting material, and
the plurality of projections are melted by flowing electricity between the plurality of projections and the turntable.

13. The brushless motor according to claim 1, wherein
at least a part of the turntable is made of a magnetic material,
the housing is arranged, on an upper surface, with a pressurizing magnet for attracting the turntable toward the housing,
the pressurizing magnet is arranged to have a portion substantially identical in radial position to the retaining member, and to face the retaining member with an axial distance therebetween, and
the distance between the retaining member and the pressurizing magnet is larger than an axial distance of axially downward movement of the retaining pieces when mounting the rotor onto the housing.

14. The brushless motor according to claim 1, wherein
three or five of the retaining pieces are equiangularly arranged.

15. The brushless motor according to claim 1, wherein a portion of each of the retaining pieces, located radially inside an inner surface of the central concave portion, has a lower surface, a radially inner end of the lower surface being above any other portions of the lower surface.

16. The brushless motor according to claim 10, wherein a portion of each of the retaining pieces, located radially inside an inner surface of the central concave portion, has a lower surface, a radially inner end of the lower surface being above any other portions of the lower surface.

17. The brushless motor according to claim 2, wherein each of the retaining pieces has an inclined portion located radially inside an inner surface of the central concave portion, the inclined portion being inclined with respect to the rotation axis such that a radially inner end of the lower surface is above any other portions of the lower surface, and
an acute angle formed by the inclined portion of each of the retaining pieces when the retaining member is in contact with the inclined surface of the retaining claw is equal to or smaller than an acute angle formed by the inclined surface of the retaining claw and the rotation axis.

18. A disk drive comprising:
the brushless motor according to claim 1 rotating a disk;
an optical pickup emitting light toward the disk and receiving the light reflected from the disk; and
a moving mechanism radially moving the optical pickup.

* * * * *